United States Patent
Sonnenschein et al.

(10) Patent No.: US 8,105,564 B2
(45) Date of Patent: Jan. 31, 2012

(54) PROCESS FOR PRODUCING MONOSILANE

(75) Inventors: Raymund Sonnenschein, Frankfurt am Main (DE); Peter Adler, Rheinfelden (DE); Yuriy Kasatkin, Moskau (RU); Adolf Petrik, Buxtehude (DE); Leonid Schwarzmann, Zaporozhye (UA)

(73) Assignee: Evonik Degussa GmbH, Essen (DE)

( * ) Notice: Subject to any disclaimer, the term of this patent is extended or adjusted under 35 U.S.C. 154(b) by 677 days.

(21) Appl. No.: 12/088,286

(22) PCT Filed: Jun. 19, 2006
(Under 37 CFR 1.47)

(86) PCT No.: PCT/EP2006/063316
§ 371 (c)(1),
(2), (4) Date: Oct. 13, 2008

(87) PCT Pub. No.: WO2007/039326
PCT Pub. Date: Apr. 12, 2007

(65) Prior Publication Data
US 2009/0155156 A1    Jun. 18, 2009

(30) Foreign Application Priority Data
Sep. 27, 2005 (DE) .......... 10 2005 046 105

(51) Int. Cl.
*B01J 8/02* (2006.01)
*C01B 33/08* (2006.01)
*C01B 33/04* (2006.01)

(52) U.S. Cl. ........ 423/341; 423/347; 422/202; 422/203; 422/211; 203/29; 203/DIG. 6

(58) Field of Classification Search .............. 422/202, 422/203, 211; 203/29, DIG. 6; 423/342, 423/347, 341
See application file for complete search history.

(56) References Cited

U.S. PATENT DOCUMENTS
5,026,533 A    6/1991 Matthes et al.
(Continued)

FOREIGN PATENT DOCUMENTS
DE    198 60 146    6/2000
(Continued)

OTHER PUBLICATIONS
U.S. Appl. No. 11/575,226, filed Oct. 12, 2007, Sonnenschein et al.
(Continued)

*Primary Examiner* — Jennifer A Leung
(74) *Attorney, Agent, or Firm* — Oblon, Spivak, McClelland, Maier & Neustadt, L.L.P.

(57) ABSTRACT

Provided is a plant for the continuous production of monosilane and tetrachlorosilane by catalytic dismutation of trichlorosilane, wherein the plant contains: a countercurrent reactor having a double wall, a catalyst bed containing a catalyst which is located in the countercurrent reactor, a condenser at the top of the countercurrent reactor, a vaporizer unit at the bottom of the countercurrent reactor, a trichlorosilane feed line for the introduction of trichlorosilane into the countercurrent reactor, a heat exchanger, with the trichlorosilane conveyed by line via the heat exchanger and preheated there by a bottom product from the vaporizer unit and, for this purpose, the bottom product is fed by line via the heat exchanger into the double wall at a level in the lower part of the countercurrent reactor and discharged from the double wall at a level in the upper part of the countercurrent reactor, a condensation unit downstream of the condenser, and a distillation column having an outlet for monosilane.

17 Claims, 2 Drawing Sheets

U.S. PATENT DOCUMENTS

| | | | |
|---|---|---|---|
| 5,094,831 A | 3/1992 | Klockner et al. | |
| 5,156,821 A | 10/1992 | Murayama et al. | |
| 5,866,721 A | 2/1999 | Hofen et al. | |
| 5,989,394 A * | 11/1999 | Johansson et al. | 203/34 |
| 6,423,859 B1 | 7/2002 | Alig et al. | |
| 6,695,928 B1 * | 2/2004 | Nakahara et al. | 134/26 |
| 6,852,301 B2 | 2/2005 | Block et al. | |
| 6,905,576 B1 * | 6/2005 | Block et al. | 203/29 |
| 6,942,844 B2 | 9/2005 | Muller et al. | |
| 7,658,900 B2 * | 2/2010 | Berthold et al. | |
| 2004/0091630 A1 | 5/2004 | Sonnenschein | |
| 2005/0014922 A1 | 1/2005 | Mueller et al. | |
| 2005/0192460 A1 | 9/2005 | Pascaly et al. | |
| 2007/0110619 A1 | 5/2007 | Adler et al. | |
| 2007/0148075 A1 | 6/2007 | Poepken et al. | |
| 2007/0248438 A1 | 10/2007 | Adler et al. | |
| 2007/0251447 A1 | 11/2007 | Muller et al. | |
| 2008/0289690 A1 * | 11/2008 | Sonnenschein et al. | |
| 2010/0266489 A1 * | 10/2010 | Rauleder et al. | |

FOREIGN PATENT DOCUMENTS

DE     100 17 168     10/2001

OTHER PUBLICATIONS

U.S. Appl. No. 11/569,774, filed May 10, 2005, Sonnenschein et al.
U.S. Appl. No. 13/062,431, filed Mar. 4, 2011, Troll et al.*
U.S. Appl. No. 12/593,765, filed Sep. 29, 2009, Troll et al.
U.S. Appl. No. 12/744,204, May 21, 2010, Rauleder et al.

* cited by examiner

PROCESS FOR PRODUCING MONOSILANE

CROSS-REFERENCE TO RELATED APPLICATIONS

The present application is a 35 U.S.C. §371 National Stage patent application of International patent application PCT/EP2006/063316, filed on Jun. 19, 2006, which claims priority to German patent application 102005046105.0, filed on Sep. 27, 2005.

FIELD OF THE INVENTION

The invention relates to a continuous process for producing monosilane and silicon tetrachloride by dismutation of trichlorosilane in the presence of a catalyst.

DISCUSSION OF THE BACKGROUND

Monosilane is an important starting material for the production of solar silicon.

SUMMARY OF THE INVENTION

Monosilane is at present generally produced by dismutation of trichlorosilane (e.g. DE21 62 537, DE2507864, DE3925357, DE33 11 650, DE 10017168, U.S. Pat. No. 3,968,199).

In the catalytic dismutation of trichlorosilane (TCS, $HSiCl_3$), monosilane ($SiH_4$) is formed together with the coproduct silicon tetrachloride (STC, $SiCl_4$) which can be used, for example, for the production of $SiO_2$. In the dismutation reaction, dichlorosilane (DCS, $H_2SiCl_2$) and monochlorosilane (MCS, $H_3SiCl$) are formed as intermediates:

$$2HSiCl_3 \rightleftharpoons H_2SiCl_2 + SiCl_4 \quad (I)$$

$$2H_2SiCl_2 \rightleftharpoons H_3SiCl + HSiCl_3 \quad (II)$$

$$2H_3SiCl \rightleftharpoons SiH_4 + H_2SiCl_2 \quad (III)$$

$$4HSiCl_3 \longrightarrow SiH_4 + 3SiCl_4 \quad (IV)$$

As catalysts for the dismutation, use is usually made of ion exchangers, e.g. in the form of amine-functionalized polystyrenes (DE 100 57 521), amine-functionalized inorganic supports (EP 0 474 265, EP 0 285 937) or organopolysiloxane catalysts (DE 39 25 357). These can be introduced directly into the column, either as a full bed (DE 25 07 864), in layers (U.S. Pat. No. 5,338,518, U.S. Pat. No. 5,776,320) or in a woven mesh structure (WO 90/02603). As an alternative, the catalyst can be accommodated in one or more external reactors, with inlets and outlets being connected to various points on the distillation column (U.S. Pat. No. 4,676,967, EP 0 474 265, EP 0 285 937, DE 37 11 444).

Owing to the physical properties of the silanes involved, cf. Table 1, and the often very unfavorable position of the chemical equilibrium in the dismutation reaction, the reaction and the work-up by distillation are generally operated as an integrated process.

TABLE 1

Physical data for chlorosilanes and monosilane

| | Material | | | | |
|---|---|---|---|---|---|
| | Monosilane | MCS | DCS | TCS | STC |
| Critical temp. [° C.] | −3.5 | 123 | 176 | 206 | 234 |
| Boiling point at atmospheric pressure [° C.] | −112 | −30 | 8.3 | 31.8 | 57.1 |
| Boiling point at 5 bar [° C.] | −78 | 15 | 60 | 87 | 117 |
| Boiling point at 25 bar [° C.] | −28 | 85 | 137 | 170 | 207 |

Thus, DE 198 60 146 discloses a continuous process for producing monosilane by catalytic dismutation of TCS in a reactive distillation column in the pressure range from 1 to 50 bar abs., with the product mixture obtained in this way being temporarily condensed in the temperature range from −25 to 50° C. (reflux of the liquid phase within the column) and the uncondensed, monosilane-containing product phase being condensed in a condenser at the top of the reactive distillation column and discharged as end product. In addition, $SiCl_4$ is formed as high-boiling bottom product in the reactive distillation column in this process and is discharged from the system via a heat exchanger.

In addition, chlorosilanes which in said process are obtained as bottom fraction in the condensation of the monosilane-containing product stream in a condenser at the top of the reactive distillation column can be at least partly recirculated to the reactive/distillative reaction region of the column.

To compensate for the disadvantage of a low reaction rate in said reactive distillation, the problem is countered in a costly fashion by means of a larger catalyst volume with addition of one or more side reactors. An even higher yield based on silicon used would be desirable. In addition, the purity of monosilane obtained by said process is about 98%.

It was thus an object of the invention to provide a further process for the production of monosilane. A particular objective was to substantially avoid the abovementioned disadvantages.

The objective is achieved according to the invention in the manner set forth in the claims.

Thus, it has surprisingly been found that monosilane having a high purity of, for example, 99.5% can be prepared continuously in an excellent yield based on silicon used of up to 98.6% of the stoichiometrically possible yield together with the coproduct tetrachlorosilane in a comparatively simple and economical way by catalytic dismutation of trichlorosilane at an operating temperature and a pressure of from 1 to 50 bar abs., preferably from 2 to 20 bar abs., particularly preferably from 3 to 15 bar abs., in particular from 4 to 10 bar abs., when, as outlined in FIGS. 1 and 2, trichlorosilane (A) is preheated by means of a heat exchanger (7), preferably to a temperature in the range from 55 to 65° C., in particular to about 60° C., at a pressure of from 1 to 10 bar abs., as indicated above, and fed to the countercurrent reactor (1) which is provided with catalyst (3), product mixture formed in the countercurrent reactor (1) is at least partly condensed by means of the condenser (5) at a temperature in the range from −25 to 50° C., preferably from −25 to −15° C., with the condensate flowing back into the countercurrent reactor (1), the product phase which is not condensed in the condenser (5) is passed to the condensation unit (8) which is operated at a temperature in the range from −110 to −40° C., the volatile product phase from the condensation unit (8) is fed to the distillation column (9) which is operated at a temperature in the range from −60 to −170° C. and monosilane (C), advantageously having a purity of about 99.5%, is discharged at the top of the distillation column (9), the $SiCl_4$-containing bottoms from the countercurrent reactor (1) are brought to a temperature in the range from 60 to 110° C., preferably from 70 to 90° C., in the vaporizer unit (6) and bottom product from the vaporizer (6) is conveyed via a heat exchanger (7) into the double wall (2) of the countercurrent reactor (1) and the $SiCl_4$-containing product stream (B) is discharged at a level in the upper region of the reactor (1).

In addition, the present process is energetically favorable and the outlay in terms of apparatus for provision of a plant which is advantageous according to the invention is comparatively low.

Particular mention may be made of the advantageous utilization of the energy of the bottom product (silicon tetrachloride) for preheating the feed stream (trichlorosilane), the additional heating and targeted temperature setting in the region of the catalyst (reactive zone of the countercurrent reactor) and the regions below it and also the opportunity, with its associated advantages, of recycling condensed chlorosilane streams in the isolation of monosilane.

In this way, the single-stage continuous process of catalytic dismutation of trichlorosilane for producing a monosilane grade which is required for the production of solar silicon has been able to be significantly improved further both in respect of product quality and of economics in a particularly advantageous way.

BRIEF DESCRIPTION OF THE FIGURES

Manufacturing plants for the continuous production of monosilane and tetrachlorosilane by catalytic dismutation of trichlorosilane according to exemplary aspects of the present invention are illustrated as flow diagrams in FIGS. 1 and 2.

DETAILED DESCRIPTION OF THE INVENTION

Figure 1:
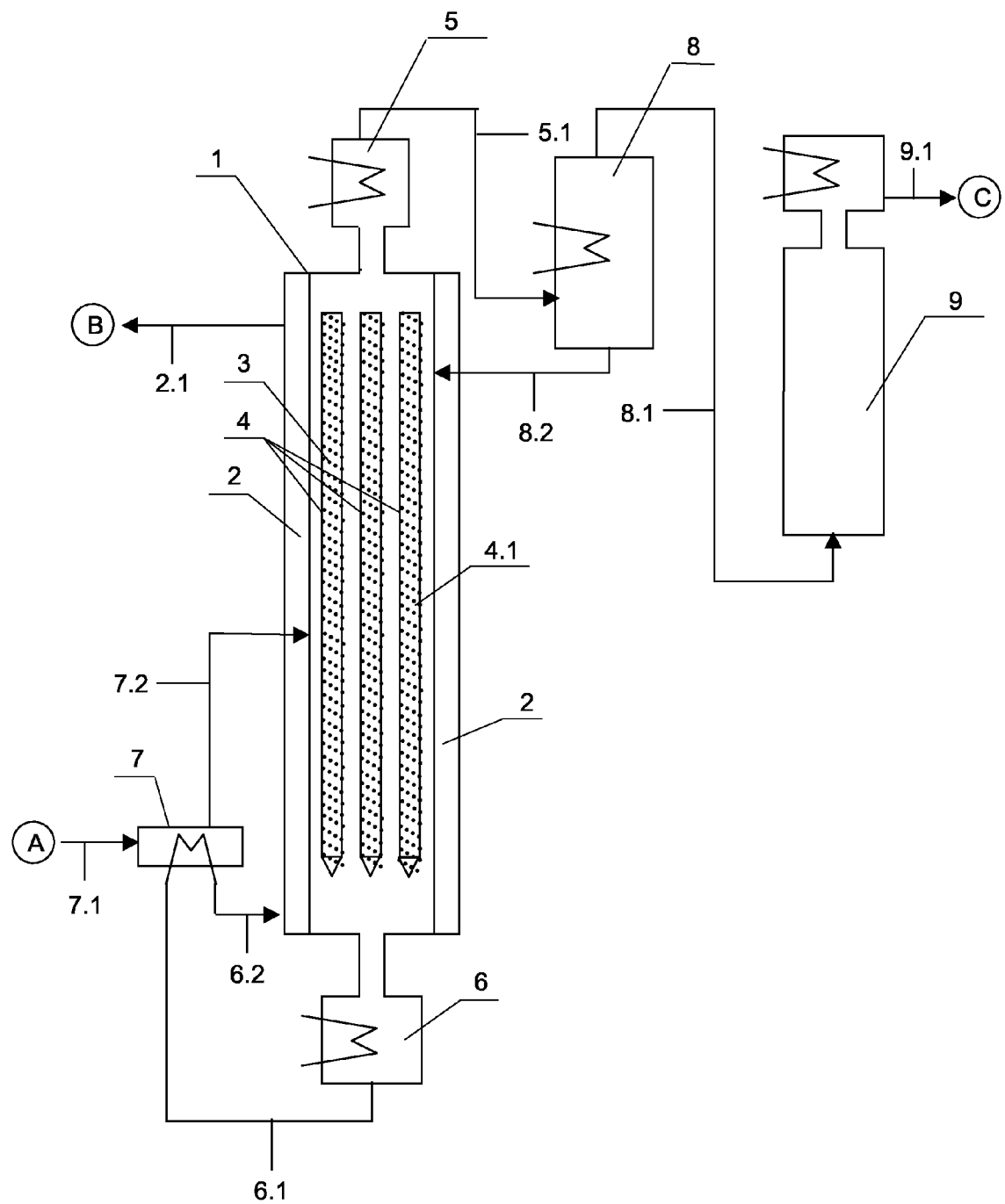

The present invention accordingly provides a plant for the continuous production of monosilane and tetrachlorosilane by catalytic dismutation of trichlorosilane at an operating temperature and a pressure of from 1 to 50 bar abs., which is based on the following units:

a countercurrent reactor (1) having a double wall (2),
at least one catalyst bed (4) which is located in the countercurrent reactor (1) and is provided with catalyst (3),
a condenser (5) at the top of the countercurrent reactor (1),
a vaporizer unit (6) at the bottom of the countercurrent reactor (1),
at least one trichlorosilane feed line (A) for the introduction of trichlorosilane (7.1, 7.2) into the countercurrent reactor (1),
a heat exchanger (7), with the trichlorosilane firstly being conveyed by means of line (7.1, 7.2) via the heat exchanger (7) and preheated there and bottom product from the vaporizer unit (6) being, for this purpose, fed by means of line (6.1, 6.2) via the heat exchanger (7) into the double wall (2) at a level in the lower part of the countercurrent reactor (1) and discharged (2.1) from the double wall (2) at a level in the upper part of the countercurrent reactor (1), i.e. discharge of silicon tetrachloride (B),
a condensation unit (8) installed downstream of the unit (5) and
a subsequent distillation column (9)

having an outlet for monosilane (C).

In the plants of the invention, the introduction of trichlorosilane (A) is advantageously carried out by means of one or more feed units which preferably lead into the middle region or the reactive zone of the countercurrent reactor (1).

Thus, the inlet for trichlorosilane (A) is preferably arranged below the fixed catalyst bed and/or at a middle height of the catalyst bed.

Figure 2:
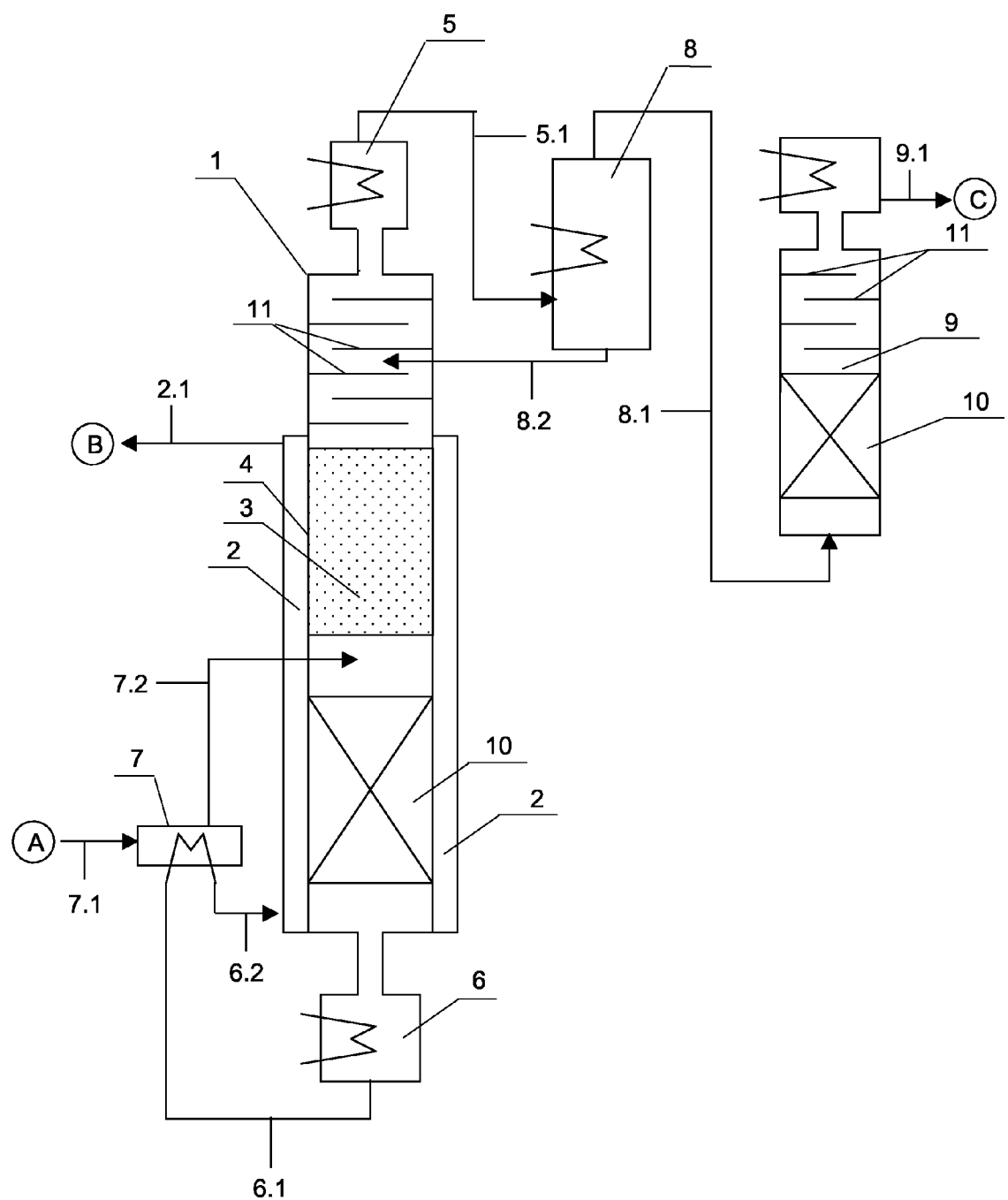

In the plant of the invention, the catalyst bed (4) can be configured in a manner known per se as a fixed bed, for example as shown in FIG. 2, and be provided with a catalyst as described at the outset. Thus, one or more fixed beds (4) can be superposed in the reactor (1).

However, it has been found to be particularly advantageous for the countercurrent reactor (1) according to the invention to be equipped with a catalyst bed (4) which comprises at least one tubular element (4.1), preferably from 3 to 6400 tubular elements, particularly preferably from 7 to 1600 and in particular from 13 to 400 tubular elements, cf. the elements (4.1) shown in FIG. 1. Here, such tubular elements (4.1) appropriately have a diameter of greater than 50 mm, preferably from 100 to 300 mm, at a wall thickness of the tubes of, for example, from 2 to 4 mm. The tubular elements can be made of a material corresponding to that of the reactor. Suitable materials for the construction of reactors for carrying out dismutation reactions are known per se. The walls of the tubular elements can be solid, perforated, for example be provided with a multiplicity of holes or slits or cuts, or have a mesh construction. In particular, the inflow and outflow sides of the individual tubular elements are configured so that, firstly, the tubular elements can accommodate the catalyst and, secondly, reaction mixture can travel without a relatively large flow resistance from the reactor into the tubular element and out again. Appropriate hydrodynamic solutions are known per se to those skilled in the art. Thus, for example, inflow and outflow sides of the tubular elements can be provided with a wire mesh. Such tubular elements (4.1) can be arranged in bundles or be suspended individually in the reactor (1). It is also possible for one or more tube bundles to be superposed in the reactor.

In plants according to the invention, it is also particularly advantageous, especially with a view to the yield based on the silicon used, for the chlorosilane-rich condensate obtained at the bottom of the condensation unit (8) to be recirculated via a line (8.2) to the upper part of the countercurrent reactor (1).

Furthermore, it can be an additional advantage in plants according to the invention for separation plates (10) and/or separation packings (11) to be located in one or more regions of the countercurrent reactor (1). Likewise, the reactive distillation column (9) can advantageously be provided with separation plates (10) and/or separation packings (11) known per se.

Preferred embodiments of plants according to the invention are shown as flow diagrams in FIGS. 1 and 2. In addition, pumps, controls and regulators which make implementation according to the invention of the present process possible in practice can be used in a manner known to those skilled in the art.

The present invention likewise provides a process for the continuous production of monosilane and silicon tetrachloride by catalytic dismutation of trichlorosilane at operating temperature and a pressure of from 1 to 50 bar abs. in a plant according to the invention, in which trichlorosilane (A) is preheated in a heat exchanger (7), and fed to the countercurrent reactor (1) which is provided with catalyst (3), product mixture formed in the countercurrent reactor (1) is at least partly condensed by means of the condenser (5) at an operating temperature in the range from −25 to 50° C., with the condensate flowing back into the countercurrent reactor (1), the product phase which is not condensed in the condenser (5) is passed to the condensation unit (8) which is operated at a temperature in the range from −40 to −110° C., the volatile product phase from the condensation unit (8) is fed to the distillation column (9) which is operated at a temperature in the range from −60 to −170° C. and monosilane (C) is discharged at the top of the distillation column (9), the $SiCl_4$-containing bottoms from the countercurrent reactor (1) are brought to an operating temperature in the range from 60 to 110° C., preferably from 70 to 90° C., in the vaporizer unit (6) and bottom product from the vaporizer (6) is conveyed via a heat exchanger (7) into the double wall (2) of the countercurrent reactor (1) and the $SiCl_4$-containing product stream (B) is discharged at a level in the upper region of the reactor (1).

Pure trichlorosilane can be used in the present process. However, it is also possible and advantageous to use an industrial trichlorosilane grade, for example having a purity of from 98.8% to 99.5%, in the process of the invention.

The countercurrent reactor (1) of the process of the invention is preferably operated at a temperature in the range from 70 to 90° C. and a pressure of from 1 to 10 bar abs. in the region of the catalyst bed (4), with the dismutation reaction proceeding exothermically and aiding the continuation of the reaction. Under the conditions which prevail here, gaseous product mixture ascends in the countercurrent reactor (1) while a liquid phase comprising predominantly silicon tetrachloride descends down to the region of the bottom of the reactor.

Furthermore, product mixture formed in the countercurrent reactor (1) in the process of the invention is partially condensed by means of the condenser (5), preferably at a temperature in the range from −10 to −25° C. and a pressure of from 1 to 10 bar abs., in particular at from about −15° C. to −20° C. and a pressure of from 1 to 10 bar abs.

The product phase which is not condensed in the condenser (5) is preferably set to a monosilane content of from ≧60 to 80% by weight.

During the further course of the process of the invention, the condensation unit (8) is preferably operated at a temperature in the range from −40 to −100° C. and a pressure of from 1 to 10 bar abs., preferably at ≦−60° C. and a pressure of from 1 to 10 bar abs., in particular at −95° C. and a pressure of from 1 to 10 bar abs.

The chlorosilane-containing condensate obtained in the condenser (8) is advantageously recycled to the countercurrent reactor (1). The condensate is preferably recirculated into the upper part of the reactor (1), appropriately below the top of the reactor, in particular in the region of the reactor where a temperature of about 20° C. prevails.

In the process of the invention, the volatile product phase from the condensation unit (8) is advantageously set to a chlorosilane content of ≦1% by weight, with the unit (8) preferably being operated at a pressure of from 5 to 10 bar abs. This phase is appropriately compressed by means of a pump before it is fed to the unit (9).

The distillation column (9) is, according to the invention, preferably operated at a temperature in the range from −90 to −110° C., particularly advantageously at about −100° C., and a pressure of from 1 to 10 bar abs. Monosilane having a high purity of from 99.5% to 99.8% is then advantageously obtained at the top of the distillation column (9) and can be discharged via the line (9.1).

The coproduct tetrachlorosilane is obtained as a hot product phase at the bottom of the countercurrent reactor (1), i.e. in the vaporizer (6).

In the process of the invention, hot bottom product from the vaporizer (6) is particularly advantageously conveyed via line (6.1), the heat exchanger (7) and line (6.2) into the double wall (2) of the countercurrent reactor (1) at a level in the lower region of the reactor and the product stream (B) comprising essentially silicon tetrachloride is discharged at a level in the upper region of the reactor (1), in particular just below the top (5) of the reactor. The silicon tetrachloride obtained here can advantageously be used for the production of silica, in particular pyrogenic silica.

In general, the process of the invention can be carried out as follows:

In a plant according to the invention, as can be seen, for example, in FIG. 1 or 2, trichlorosilane is preheated and fed at from 1 to 50 bar abs. into a countercurrent reactor which is provided with catalyst and is at the operating temperature. To preheat the feed stream, it is advantageous to utilize the hot product stream from the bottom of the reactor. Furthermore, the energy/heat in the $SiCl_4$ product obtained can be utilized for advantageous additional heating of the countercurrent reactor by means of the double wall, in particular in the region of the catalyst bed. The product mixture formed in the dismutation reaction in the countercurrent reactor can be partially condensed at the top of the reactor, with essentially chlorosilanes flowing in liquid form back into the reactor. Uncondensed product phase is advantageously passed to a further condensation unit which is preferably operated under superatmospheric pressure at a temperature in the range from −40 to −110° C. Chlorosilane-containing condensate obtained here is advantageously recirculated to the upper part of the countercurrent reactor. The volatile product phase from the after-condenser can then be passed to a distillation column from which monosilane can be discharged as overhead product in a comparatively high yield and in high purity.

The present invention is illustrated by the following example without restricting the scope of the invention as such.

EXAMPLE

The process of the invention was tested under production conditions in a plant which is shown in principle as a preferred embodiment in FIG. 1 and whose preferred mode of operation has been described above. Technical-grade trichlorosilane (98.8%) was used as starting material. Anion-exchange resin Amberlyst 21 was used as catalyst. The consumption of trichlorosilane was 700 kg/hour.

The mode of operation according to the invention effected an increase in the silicon recovery from 98.2 to 98.6% of the stoichiometrically possible value. The monosilane obtained in this way had a purity of 99.5%. In addition, the product costs could be reduced by a factor of from 2 to 2.2 using the mode of operation according to the invention.

LEGENDS FOR FIGS. 1 AND 2

| 1 | Countercurrent reactor |

-continued

| 2 | Double wall |
| 3 | Catalyst |
| 4 | Catalyst bed |
| 5 | Condenser |
| 6 | Vaporizer unit |
| 7 | Heat exchanger |
| 8 | Condenser unit |
| 9 | Distillation column |
| 10 | Separation packings |
| 11 | Separation plates |
| A | Trichlorosilane |
| B | Silicon tetrachloride |
| C | Monosilane |

The invention claimed is:

1. A plant for the continuous production of monosilane and tetrachlorosilane by catalytic dismutation of trichlorosilane at an operating temperature and a pressure of from 1 to 50 bar abs., comprising the following units:
   a countercurrent reactor (1) having a double wall (2),
   at least one catalyst bed (4) which is located in the countercurrent reactor (1) and is provided with catalyst (3),
   a condenser (5) at the top of the countercurrent reactor (1),
   a vaporizer unit (6) at the bottom of the countercurrent reactor (1),
   at least one trichlorosilane feed line (7.1, 7.2) for the introduction of trichlorosilane (A) into the countercurrent reactor (1),
   a heat exchanger (7), with the trichlorosilane firstly conveyed by line (7.1, 7.2) via the heat exchanger (7) and preheated there by a bottom product from the vaporizer unit (6) and, for this purpose, the bottom product is fed by line (6.1, 6.2) via the heat exchanger (7) into the double wall (2) at a level in the lower part of the countercurrent reactor (1) and discharged (2.1, B) from the double wall (2) at a level in the upper part of the countercurrent reactor (1),
   a condensation unit (8) installed downstream of the condenser (5), and
   a subsequent distillation column (9) having an outlet for monosilane (C).

2. The plant according to claim 1, wherein said countercurrent reactor contains at least one tubular element (4.1) as catalyst bed (4).

3. The plant according to claim 1, wherein one or more trichlorosilane feed lines (A) lead into the middle region of the countercurrent reactor (1) or into a reactive zone of the catalyst bed (4) provided with catalyst (3).

4. The plant according to claim 3, wherein the inlet for trichlorosilane (A) is arranged below the catalyst bed (4) and/or at a middle height of the catalyst bed (4).

5. The plant according to claim 1, wherein a line (8.2) leads from the bottom of the condensation unit (8) into the upper part of the countercurrent reactor (1).

6. The plant according to claim 1, wherein separation plates (10) and/or separation packings (11) are located in one or more regions of the countercurrent reactor (1).

7. The plant according to claim 1, wherein the distillation column (9) is provided with separation plates (10) and/or separation packings (11).

8. A process for the continuous production of monosilane and silicon tetrachloride by catalytic dismutation of trichlorosilane at operating temperature and a pressure of from 1 to 50 bar abs, in a plant according to claim 1, comprising:
   preheating trichlorosilane (A) in the heat exchanger (7) which is fed into the countercurrent reactor (1) which is provided with catalyst (3),
   forming a product mixture in the countercurrent reactor (1) that is at least partly condensed by the condenser (5) at an operating temperature in the range from −25 to 50° C., with the condensate flowing back into the countercurrent reactor (1),
   passing the product phase which is not condensed in the condenser (5) into the condensation unit (8) which is operated at a temperature in the range from −40 to −110° C.,
   feeding the volatile product phase from the condensation unit (8) into the distillation column (9) which is operated at a temperature in the range from −60 to −170° C. and monosilane (C) is discharged at the top of the distillation column (9),
   heating the $SiCl_4$-containing bottoms from the countercurrent reactor (1) to an operating temperature in the range from 60 to 110° C. in the vaporizer unit and
   conveying bottom product from the vaporizer unit (6) via the heat exchanger (7) into the double wall (2) of the countercurrent reactor (1) and the $SiCl_4$-containing product stream (B) is discharged at a level in the upper region of the reactor (1).

9. The process according to claim 8, wherein the process is operated at a pressure in the range from 1 to 10 bar abs.

10. The process according to claim 8, wherein the countercurrent reactor (1) is operated at a temperature in the range from 70 to 90° C. and a pressure of from 1 to 10 bar abs, in the region of the catalyst bed (4).

11. The process according to claim 8, wherein the product mixture formed in the countercurrent reactor (1) is partially condensed by the condenser (5) at a temperature in the range from −25 to −10° C. and a pressure of from 1 to 10 bar abs.

12. The process according to claim 8, wherein the product phase which is not condensed in the condenser (5) is set to a monosilane content of 60% by weight.

13. The process according to claim 8, wherein the condensation unit (8) is operated at a temperature of from −60° C. to −100° C. and a pressure of from 1 to 10 bar abs.

14. The process according to claim 8, wherein the chlorosilane-containing condensate obtained in the condensation unit (8) is recycled to the countercurrent reactor (1).

15. The process according to claim 8, wherein the volatile product phase from the condensation unit (8) is set to a chlorosilane content of $\leq 1\%$ by weight and compressed, where the unit (8) is operated at a pressure of from 5 to 10 bar abs.

16. The process according to claim 8, wherein the distillation column (9) is operated at a temperature in the range from −90 to −110° C. and a pressure of from 1 to 10 bar abs.

17. The process according to claim 8, wherein the hot bottom product from the vaporizer (6) is conveyed via line (6.1), the heat exchanger (7) and line (6.2) into the double wall (2) of the countercurrent reactor (1) at a level in the lower region of the reactor and $SiCl_4$-containing product stream (B) is discharged at a level in the upper region of the reactor (1).

* * * * *